United States Patent
Shinn et al.

(10) Patent No.: US 7,073,171 B2
(45) Date of Patent: Jul. 4, 2006

(54) EJB IMPLEMENTATION CLASS LOADING WITH REMOVED DEPENDENCIES WITH ABILITY TO REPLACE EJB IMPLEMENTATION CLASS WITHOUT FULL REDEPLOYMENT

(75) Inventors: Matthew Shinn, San Francisco, CA (US); Seth White, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 183 days.

(21) Appl. No.: 10/787,706

(22) Filed: Feb. 26, 2004

(65) Prior Publication Data

US 2004/0172404 A1    Sep. 2, 2004

Related U.S. Application Data

(60) Provisional application No. 60/450,779, filed on Feb. 28, 2003.

(51) Int. Cl.
*G06F 9/44* (2006.01)

(52) U.S. Cl. .................. 717/166; 717/159; 717/170

(58) Field of Classification Search ............. 717/166, 717/159, 170
See application file for complete search history.

(56) References Cited

U.S. PATENT DOCUMENTS

| | | | | |
|---|---|---|---|---|
| 5,805,896 A | * | 9/1998 | Burgess | 717/166 |
| 5,815,718 A | | 9/1998 | Tock | 395/705 |
| 5,950,008 A | * | 9/1999 | van Hoff | 717/139 |
| 5,970,252 A | * | 10/1999 | Buxton et al. | 717/166 |
| 5,974,428 A | * | 10/1999 | Gerard et al. | 707/203 |
| 6,081,665 A | * | 6/2000 | Nilsen et al. | 717/116 |
| 6,092,120 A | * | 7/2000 | Swaminathan et al. | 709/247 |
| 6,237,135 B1 | | 5/2001 | Timbol | 717/1 |
| 6,330,709 B1 | * | 12/2001 | Johnson et al. | 717/100 |
| 6,339,841 B1 | * | 1/2002 | Merrick et al. | 717/166 |
| 6,442,753 B1 | * | 8/2002 | Gerard et al. | 717/170 |
| 6,530,080 B1 | * | 3/2003 | Fresko et al. | 717/166 |
| 6,571,388 B1 | * | 5/2003 | Venkatraman et al. | 717/166 |
| 6,631,521 B1 | * | 10/2003 | Curtis | 717/175 |
| 6,658,492 B1 | * | 12/2003 | Kawahara et al. | 719/332 |
| 6,675,381 B1 | * | 1/2004 | Yamaguchi | 717/168 |
| 6,851,111 B1 | * | 2/2005 | McGuire et al. | 717/166 |
| 6,915,511 B1 | * | 7/2005 | Susarla et al. | 717/166 |
| 6,973,646 B1 | * | 12/2005 | Bordawekar et al. | 717/146 |
| 6,983,315 B1 | * | 1/2006 | Crutcher | 709/220 |

OTHER PUBLICATIONS

"Toward a Provably-Correct Implementation of the JVM Bytecode Verifier", Alessandro Coglio et al, IEEE, pp. 403-410, Jan. 27, 2000.*

"Dynamic Behaviours for Computer Animation", I J Palmer, IEEE, 1997, pp. 151-156.*

* cited by examiner

*Primary Examiner*—Todd Ingberg
(74) *Attorney, Agent, or Firm*—Fliesler Meyer LLP

(57) ABSTRACT

A system and method for EJB classloading. By changing the EJB classloading scheme so that the EJB impl class is loaded in a child ClassLoader, the system allows the old EJB impl class to be replaced with a new one without disturbing the rest of the deployment. The key to doing this is to remove all direct references to the EJB impl class from classes loaded in the parent ClassLoaders. Removing this dependency allows the old EJB impl class to be replaced at any time with a new impl class.

12 Claims, 1 Drawing Sheet

Old classloading scheme:

New classloading scheme:

EJB IMPLEMENTATION CLASS LOADING WITH REMOVED DEPENDENCIES WITH ABILITY TO REPLACE EJB IMPLEMENTATION CLASS WITHOUT FULL REDEPLOYMENT

CLAIM OF PRIORITY

This application claims priority to U.S. Provisional Patent Application 60/450,779, filed Feb. 28, 2003, entitled "SYSTEM AND METHOD FOR EJB CLASSLOADING", and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and software development systems, and particularly to a system and method for EJB classloading.

BACKGROUND

The architecture of the traditional EJB classloading scheme is such that any changes to the EJB implementation (impl) class forces the developer to go through a full redeployment (undeploy and redeploy cycle) for the changes to take effect. This results in unnecessary work being done, since much of the EJB deployment code that had to execute has no direct dependency on the EJB impl class. One of the downsides is that it takes longer than necessary to have the new EJB impl changes take effect.

Another problem is that a full redeployment can be very disruptive, since it invalidates all references to the EJB and forces clients to obtain those references again to continue to invoke on the EJB.

SUMMARY

The invention provides a system and method for EJB classloading. By changing the EJB classloading scheme so that the EJB impl class is loaded in a child ClassLoader, the system makes it possible to replace the old EJB impl class with a new one without disturbing the rest of the deployment. The key to doing this is to remove all direct references to the EJB impl class from classes loaded in the parent ClassLoaders. Removing this dependency allows the old EJB impl class to be replaced at any time with a new impl class.

DETAILED DESCRIPTION

The invention provides a system and method for EJB classloading. The EJB classloading scheme is changed so that the EJB impl class* is loaded in a child ClassLoader. This allows us to replace the old EJB impl class with a new one without disturbing the rest of the deployment. (* by referring to EJB implementation class, this means the implementation class and all super classes).

The architecture of the traditional EJB classloading scheme is such that any changes to the EJB implementation (impl) class forces the developer to go through a full redeployment (undeploy and redeploy cycle) for the changes to take effect. This results in unnecessary work being done, since much of the EJB deployment code that had to execute has no direct dependency on the EJB impl class. One of the downsides is that it takes longer than necessary to have the new EJB impl changes take effect.

By changing the EJB classloading scheme so that the EJB impl class is loaded in a child ClassLoader, it is possible to replace the old EJB impl class with a new one without disturbing the rest of the deployment. The key to doing this is to remove all direct references to the EJB impl class from classes loaded in the parent ClassLoaders. Removing this dependency allows the old EJB impl class to be replaced at any time with a new impl class.

Implementing this, however, presents some unique challenges. First, one must ensure the EJB impl class is actually loaded in the child and not from the parent ClassLoader. This is achieved via a custom ClassLoader implementation in which the EJB impl class is specifically disallowed from being loaded in the parent ClassLoader. This is necessary because the parent ClassLoader has access to the EJB impl class along with the rest of the EJB classes since they are all packaged together.

Another challenge is ensuring none of the classes loaded in the parent ClassLoader have direct references to the classes loaded in the child ClassLoader. This is achieved by generating a custom interface for the EJB impl class, declaring all methods that are invoked on the EJB impl by the classes loaded in the parent ClassLoader. The classes in the parent ClassLoader then refer to the bean class interface instead of the bean class, and the direct dependency is removed.

Figure 1:
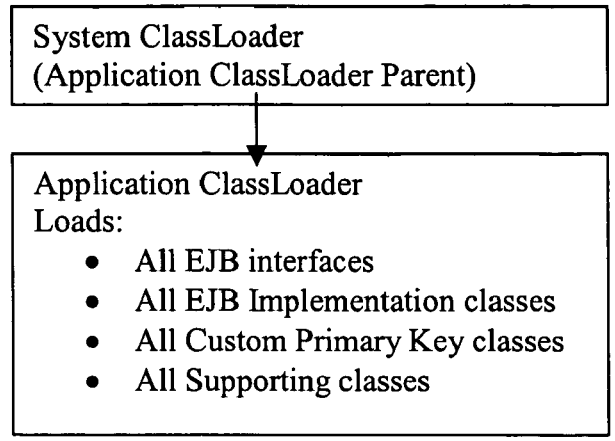
FIG. 1 shows a classloading scheme used in a typical application server.

FIG. 1 shows a classloading scheme used in a typical application server.

Figure 2:
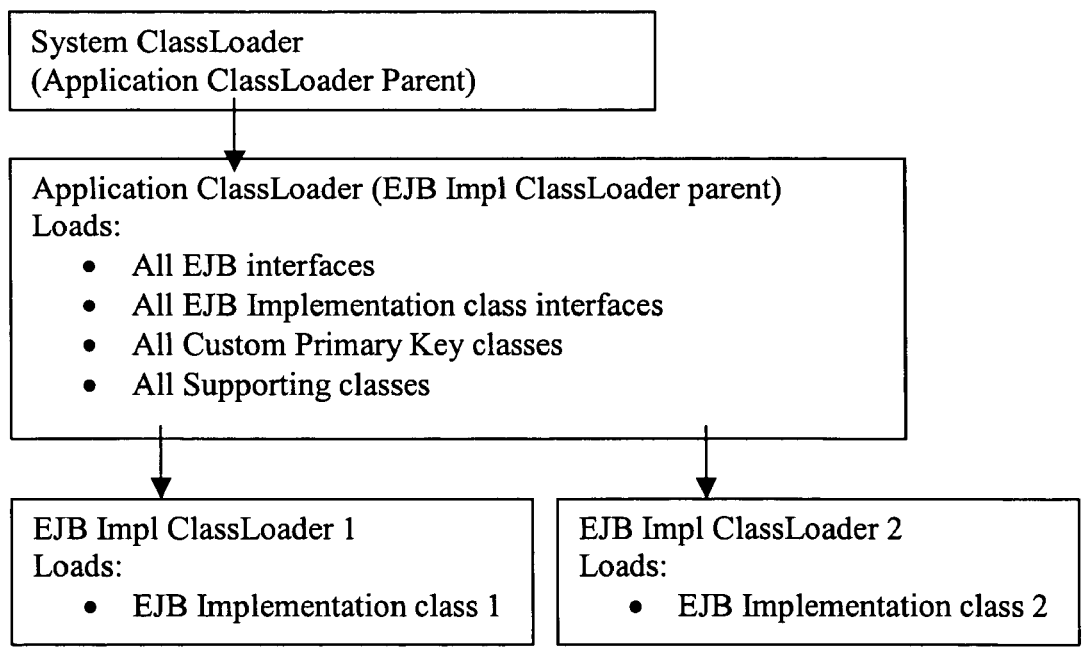
FIG. 2 shows a classloading scheme as used in accordance with an embodiment of the invention.

FIG. 2 shows a classloading scheme as used in accordance with an embodiment of the invention. Note that this example assumes the application only contains two EJBs—the techniques described herein can also be extended to support multiple-EJB applications. As shown in FIG. 2, each EJB impl class is loaded in a child ClassLoader. This makes it possible to replace the old EJB impl class with a new one without disturbing the rest of the deployment. All direct references to the EJB impl class from classes loaded in the parent ClassLoaders are removed.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, servers, and computing environments, may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for EJB classloading comprising:
   a computer including an EJB stored thereon, said EJB having an EJB implementation class associated therewith;
   a parent classloader for loading EJB implementation class interfaces;
   a custom child classloader for loading the EJB implementation class such that all direct references to the EJB implementation class are removed from the parent classloader; and
   wherein dependencies of the EJB implementation class upon its parent classloader are removed such that the EJB implementation class is capable of being replaced with a new EJB implementation class in a computer readable medium without requiring full redeployment.

2. The system of claim 1 wherein the custom classloader implementation used for the EJB implementation class is specifically disallowed from being loaded in the parent classloader.

3. The system of claim 1 wherein a custom interface is generated for the EJB implementation class, wherein said custom interface declares all methods that are invoked on the EJB implementation class by the classes loaded in the parent classloader.

4. The system of claim 3 wherein the classes in the parent classloader refer to the custom bean class interface.

5. A method for EJB classloading comprising the steps of:
   providing a computer including an EJB stored thereon, said EJB having an EJB implementation class associated therewith;
   providing a parent classloader for loading EJB implementation class interfaces and a custom child classloader for loading the EJB implementation class;
   loading the EJB implementation class in a child classloader such that all direct references to the EJB implementation class from classes loaded in the parent classloaders are removed; and
   wherein dependencies of the EJB implementation class upon its parent classloader are removed such that the EJB implementation class is capable of being replaced with a new EJB implementation class in a computer readable medium without requiring full redeployment.

6. The method of claim 5 wherein the custom classloader implementation used for the EJB implementation class is specifically disallowed from being loaded in the parent classloader.

7. The method of claim 5 wherein a custom interface is generated for the EJB implementation class, wherein said custom interface declares all methods that are invoked on the EJB implementation class by the classes loaded in the parent classloader.

8. The method of claim 7 wherein the classes in the parent classloader refer to the custom bean class interface.

9. A computer readable medium including instructions stored thereon which when executed cause the computer to perform the steps of:
   providing a computer including an EJB stored thereon, said EJB having an EJB implementation class associated therewith; and,
   providing a parent classloader for loading EJB implementation class interfaces and a custom child classloader for loading the EJB implementation class;
   loading the EJB implementation class in the child classloader such that all direct references to the EJB implementation class from classes loaded in the parent classloaders are removed; and
   wherein dependencies of the EJB implementation class upon its parent classloader are removed such that the EJB implementation class is capable of being replaced with a new EJB implementation class in a computer readable medium without requiring full redeployment.

10. The computer readable medium of claim 9 wherein the custom classloader implementation used for the EJB implementation class is specifically disallowed from being loaded in the parent classloader.

11. The computer readable medium of claim 9 wherein a custom interface is generated for the EJB implementation class, wherein said custom interface declares all methods that are invoked on the EJB implementation class by the classes loaded in the parent classloader.

12. The computer readable medium of claim 11 wherein the classes in the parent classloader refer to the custom bean class interface.

* * * * *